US007509721B1

(12) United States Patent
Liang

(10) Patent No.: US 7,509,721 B1
(45) Date of Patent: Mar. 31, 2009

(54) PUNCHING AND RIVETING TOOL

(75) Inventor: Yu-Ming Liang, Chang Hwa Hsien (TW)

(73) Assignee: Morn Sun Dev. Co., Ltd., Chang Hwa Hsien (TW)

( * ) Notice: Subject to any disclaimer, the term of this patent is extended or adjusted under 35 U.S.C. 154(b) by 89 days.

(21) Appl. No.: 11/676,350

(22) Filed: Feb. 19, 2007

(51) Int. Cl.
*B23Q 17/00* (2006.01)

(52) U.S. Cl. ...................... 29/243.53; 29/249; 29/243.5

(58) Field of Classification Search .............. 29/243.53, 29/249, 525.07, 798, 524.1, 407.02, 525.06, 29/243.5, 251, 243.54; 72/452.8, 407, 453.07
See application file for complete search history.

(56) References Cited

U.S. PATENT DOCUMENTS 5,673,839 A * 10/1997 Howard et al. .............. 227/119
6,546,609 B1 * 4/2003 Lee et al. ................. 29/243.53
7,107,814 B2 * 9/2006 Winterhalter et al. .... 72/453.07
7,290,431 B1 * 11/2007 Spivak et al. .............. 72/452.8
2006/0070222 A1 * 4/2006 Clew ....................... 29/407.02
2006/0175729 A1 * 8/2006 Braun ........................ 264/249
2006/0191120 A1 * 8/2006 Weeks et al. ............. 29/407.08

* cited by examiner

*Primary Examiner*—Lee D Wilson
(74) *Attorney, Agent, or Firm*—Egbert Law Offices PLLC

(57) ABSTRACT

The punching and riveting tool includes a pipe shaft, an energy storage spring, a weight control rod, a front cap, a collision head, a punching head, a rear cap, a pressing button, a binding spring and a lock nut. The pipe shaft is in the shape of a hollow pipe, and two ends of the energy storage spring are linked with the weight control rod and the collision head respectively. The collision head is configured with a collision part on the upper end, and a binding slot on the lower end, and the punching head is configured on the bottom end of the collision head. The pressing button is configured with a go-through part and a binding part, and the binding spring with the pressing button are configured in the counterbore of the rear cap. The lock nut is linked onto the tail end of the weight control rod.

3 Claims, 10 Drawing Sheets

PUNCHING AND RIVETING TOOL

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a punching and riveting tool structure, and more particularly to a punching and riveting tool that can punch a hole through materials like paperboard, leather, cloth etc., and can also rivet nails like eyelet rivets or hollow rivets through paperboard, leather, cloth etc.

2. Description of Related Art Including Information Disclosed Under 37 CFR 1.97 and 37 CFR 1.98

For strengthening, decorating or other various purposes, sheet materials like paperboard, leather or cloth, etc. often need to be punched or bound with eyelet rivets or hollow rivets. As shown in FIGS. 6, 7, 8, the structure of prior-art punching and riveting tools comprises a pipe shaft 10, a weight 11, a collision spring 12, a rear cap 13, an eccentric spring 14, an eccentric rod 15, an expansion link 16, a front cap 17 and a punching head 18. The pipe shaft 10 is in the shape of a hollow pipe. Inside the hole, a smaller guiding hole 101 is configured in the middle section. In the center of the weight 11, there is an impact hole 111 that is aligned to the guiding hole 101. The collision spring 12 is configured inside the upper hollow space of the pipe shaft 10, and is positioned behind the weight 11, so that it can push the weight 11 forward. The rear cap 13 functions to lock and seal the upper hollow space of the pipe shaft 10 and to fix the weight 11 and the collision spring 12. The eccentric spring 14 is bound with the eccentric rod 15 with deflection to one side. In the upper section of the eccentric rod 15, there is a pushing part 151 with small diameter. In the middle section, there is a guiding slant 152, and in the lower section, there is a binding head 153 that binds with the eccentric spring 14. On the upper end of the expansion link 16, there is a stopping block 161, and the lower section is a slender protrusion. The expansion link 16 is configured within the front cap 17, while the front cap 17 is locked onto the lower section of the pipe shaft 10, so as to fix the eccentric spring 14, the eccentric rod 15 and the expansion link 16. At the end of the front cap 17, there is a punch hole 171 so that the expansion link 16 can stretch out. The stopping block 161 can retain the expansion link 16 inside the pipe. The punching head 18 is attached to the protrusion of the expansion link 16. The punching head 18 may change to different shapes and sizes depending on different punching or riveting actions.

The mechanical principle of the prior-art punching and riveting tool structure is disclosed in FIGS. 9 and 10. The whole tool is pressed down. When the collision spring 12 is compressed to a certain degree, it instantly releases the accumulated pressure force to generate an impulse and collision with the expansion link 16, resulting in a punching or riveting action of the punching head 18. The instant release of accumulated pressure is accomplished through the following manner. When the tool is pressed down, the expansion link 16 is pushed inward to push the eccentric rod 15, so that the pushing part 151 of the eccentric rod 15 pushes the weight 11 with deflection to one side and compresses the collision spring 12. When pushed to a certain depth, the guiding slant 152 of the eccentric rod 15 will contact the guiding hole 101 of the pipe shaft 10. As a result, the eccentric rod 15 originally deflected to one side is now guided to the center. When the eccentric rod 15 is guided to the pushing part 151 and aligned to the impact hole 111, the whole pushing part 151 will instantly drop into the impact hole 111, and the collision spring 12 will instantly release the pressing force along the space of this length, causing the weight 11 to strike the eccentric rod 15, the expansion link 16, and the punching head 18, which impacts the processed material.

However, owing to the short stroke of the pressing action, the collision spring 12 is configured to be thick and requires a strong pressing force. Hence, because of the force is solely exerted by the user, sufficient force by the user is necessary. Otherwise, the collision spring 12 cannot be compressed to the degree for instant release of the pressure. For this reason, there are cases including young-aged people with insufficient force, who cannot or can hardly press down the tool. Therefore, such prior art punching and riveting tools are not easy and convenient to use. Moreover, the eccentric function is realized mainly through a specially processed eccentric spring 14, which is very difficult to produce and is not cost-effective.

Thus, to overcome the aforementioned problems of the prior art, it would be an advancement in the art to provide an improved structure that can significantly improve efficacy.

To this end, the inventor has provided the present invention of practicability after deliberate design and evaluation based on years of experience in the production, development and design of related products.

BRIEF SUMMARY OF THE INVENTION

The collision action of the present invention is generated by pulling the weight control rod 22 upward, so that the energy storage spring 21 is stretched and elongated. Using this operational form, such energy storage spring 21 can be of thin specification, but can still generate sufficient impact force. Hence, only a small force is needed to pull the spring, completely independent upon body weight It is therefore suitable for anyone. Even young-aged children or females can operate this tool easily and conveniently for punching and riveting.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
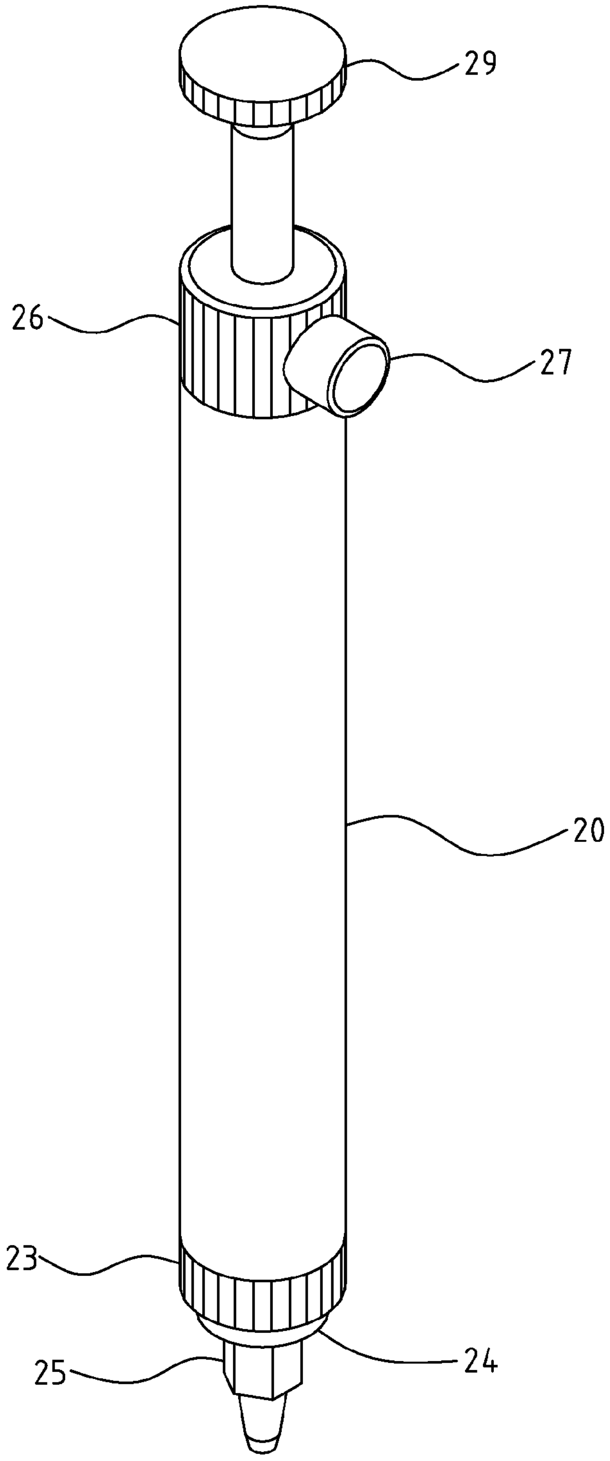
FIG. 1 shows a combined perspective view of the present invention.
Figure 2:
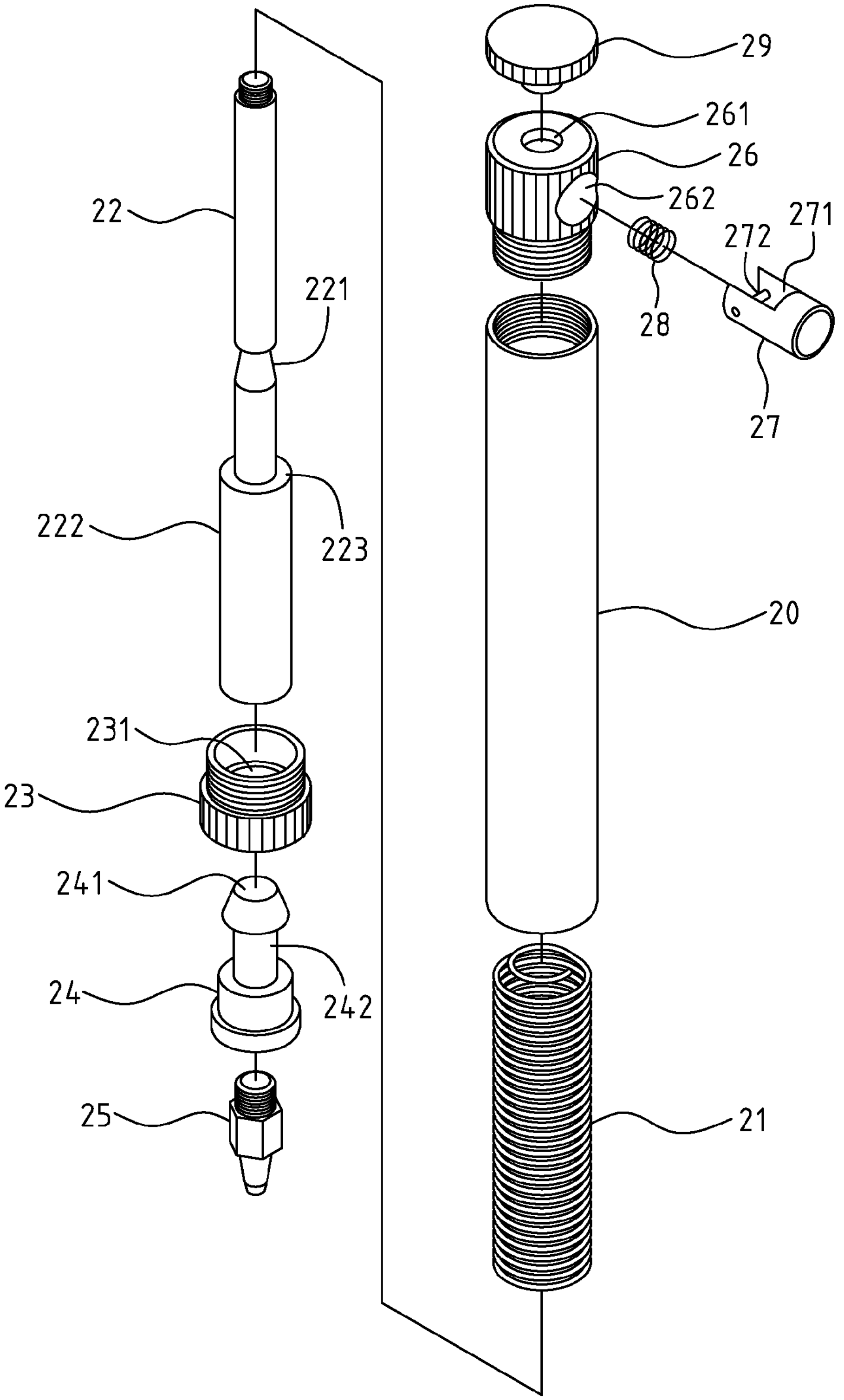
FIG. 2 shows an exploded perspective view of the present invention.

FIGS. 1 and 2 depict a preferred embodiment of the improved structure of punching and riveting tool disclosed in the present invention. However, this embodiment is for descriptive purposes only. The patent application is not limited to such structure. The punching and riveting tool comprises a pipe shaft 20, an energy storage spring 21, a weight control rod 22, a front cap 23, a collision head 24, a punching head 25, a rear cap 26, a pressing button 27, a binding spring 28 and a lock nut 29. The pipe shaft 20 is in the shape of a hollow pipe, to house various mechanical parts. Its upper and lower ends are configured with a front cap 23 and a rear cap 26. The two ends of the energy storage spring 21 are linked respectively with the weight control rod 22 and the collision head 24. The middle section of the weight control rod 22 is configured with a latch pin 221, and a weight 222 is configured at the lower position. Above the weight, there is a spring binding part 223. The front cap 23 is screwed onto the lower end of the pipe shaft 20. In the center of the front cap, there is a through hole 231. On the upper end of the collision head 24, there is a collision part 241. Below the collision part 241, there is a spring binding part 242, and at the lower end, there is a binding slot 243. The punching head 25 is configured at the lower end of the collision head 24. The rear cap 26 is screwed onto the upper end of the pipe shaft 20. The center of the rear cap is configured with a punch hole 261. A counterbore 262 is configured outside. The counterbore 262 is aligned to the punch hole 261. The pressing button 27 is configured with a go-through part 271, and a binding part 272 is configured outside. The binding spring 28 and the pressing button 27 is configured at the counterbore 262 of the rear cap 26. The lock nut 29 is attached to the tail end of the weight control rod 22.

Figure 3:
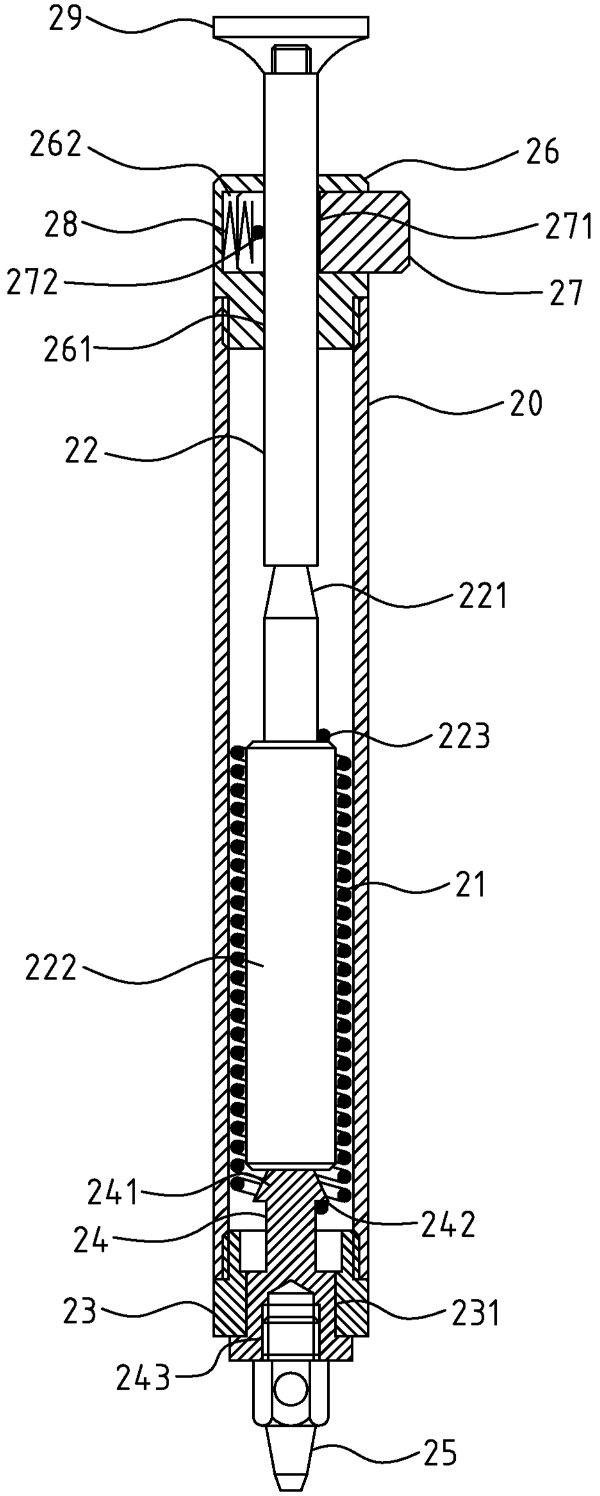
FIG. 3 shows a combined sectional view of the present invention.
Figure 4:
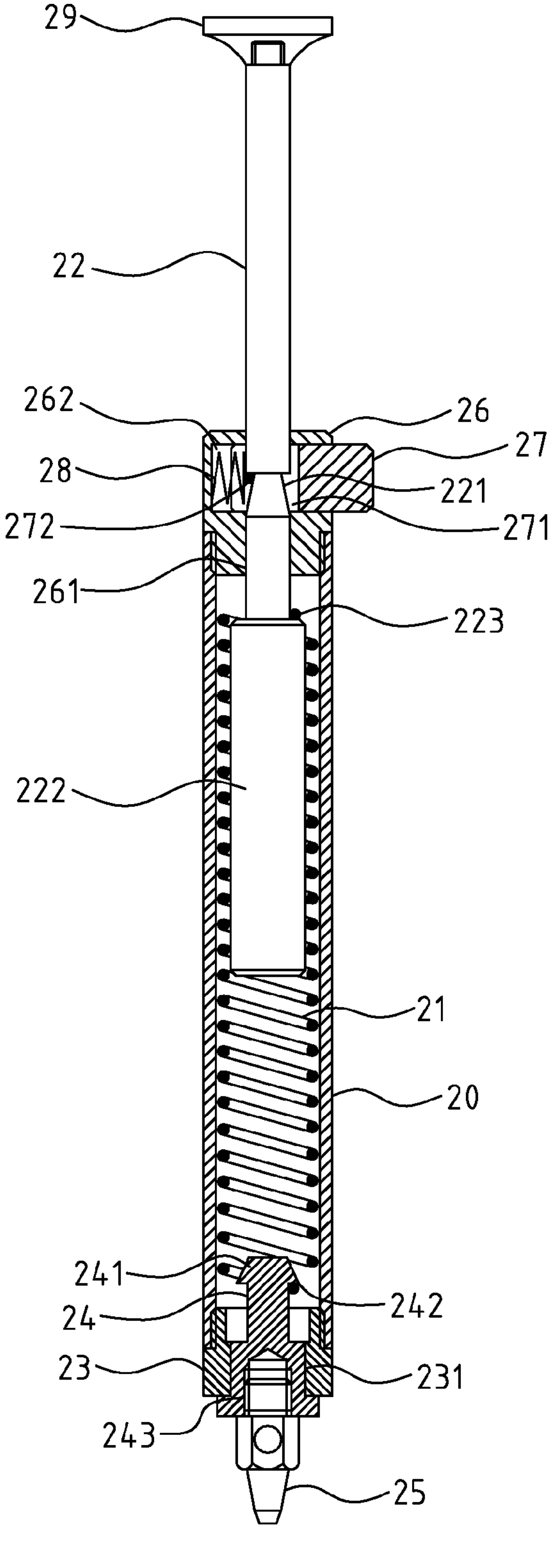
FIG. 4 shows a sectional view of the operation of energy storage of the present invention.

In the assembled view of the above-mentioned structure, as shown in FIGS. 1 and 3, the collision part 241 of the collision head 24 goes through the through hole 231 of the front cap 23, and is locked on the through hole 231 to avoid further advance inward. The two ends of the energy storage spring 21 are attached to the spring binding part 223, 242 respectively of the weight control rod 22 and the collision head 24. The weight control rod 22 and the collision head 24 are housed in the pipe shaft 20. The front cap 23 is locked on the lower end of the pipe shaft 20, and the tail end of the weight control rod 22 is protruded above the pipe shaft 20. The binding spring 28 and the pressing button 27 are housed in the counterbore 262 of the rear cap 26, so that the pressing button 27 is shot out by the binding spring 28. The rear cap 26 is locked on the upper end of the pipe shaft 20, and the tail end of the weight control rod 22 goes through the punch hole 261 and the go-through part 271, and is finally linked to the tail end of the weight control rod 22 with the lock nut 29. Through configuration of the lock nut 29, the weight control rod 22 is easily pulled.

The operation of this structure is described as follows. When the structure combination is completed, the weight control rod 22 is pulled to the collision head 24 by the energy storage spring 21. The energy storage spring 21 within the pipe shaft 20 has a section of space. When the lock nut 29 and the weight control rod 22 is pulled, the lower end of the energy storage spring 21 is limited by the collision head 24, while the upper end is stretched by the weight control rod 22. When the latch pin 221 of the weight control rod 22 passes the pressing button 27, the pressing button 27 will be pushed by the binding spring 28, and its binding part 272 will be locked into the latch pin 221, causing the weight control rod 22 to be restrained at this height. Now the punching head 25 is targeted to the target point. After confirmation, by pressing down the pressing button 27, the weight control rod 22 will lose its latching force and be pulled downward instantly by the energy storage spring 21, causing the weight 222 of the weight control rod 22 to impact the collision part 241 of the collision head 24. On losing the pull by the energy storage spring 21, the collision head 24 is knocked by the weight control rod 22, causing the attached punching head 25 to impact the processed material to punch a hole or to conduct a riveting.

Figure 5:
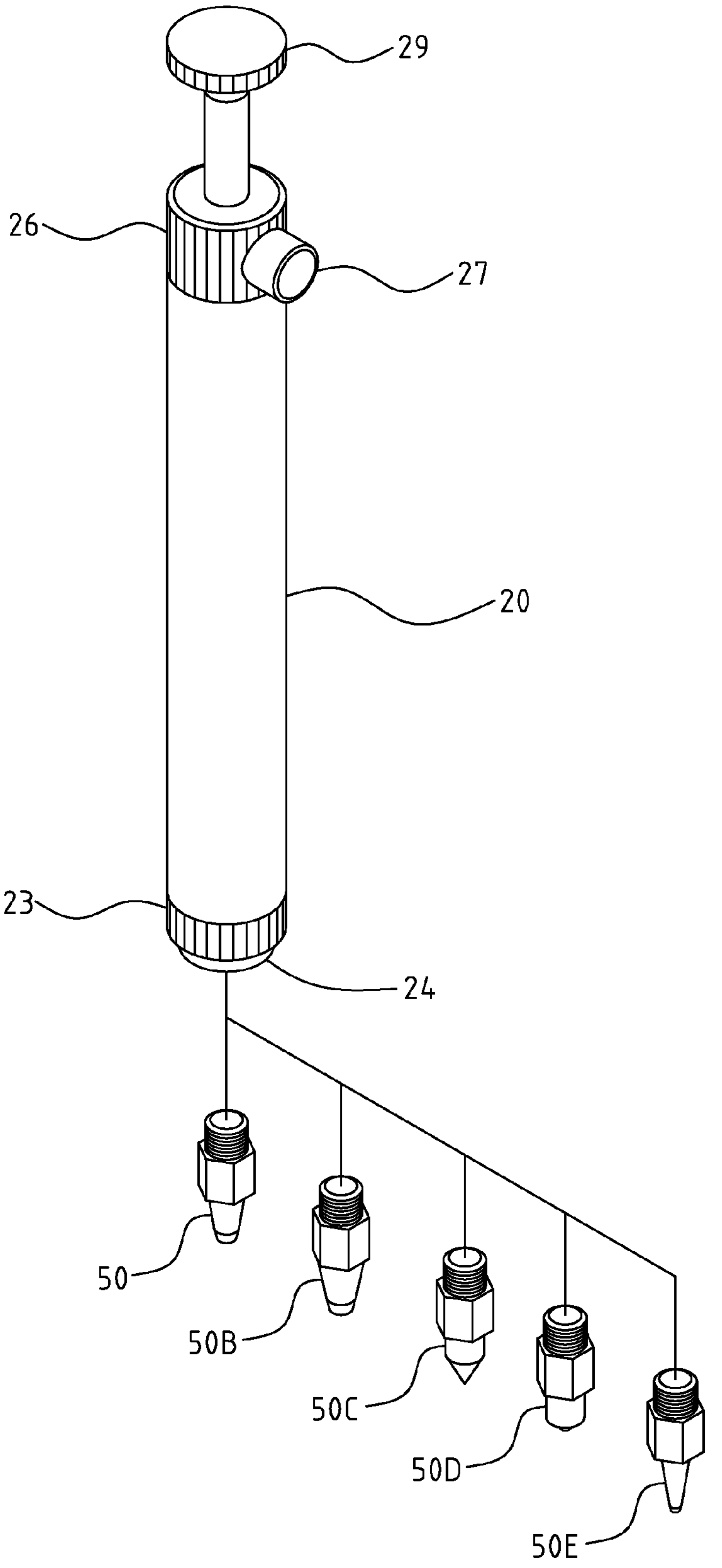
FIG. 5 shows perspective views of the various optional punching heads for the punching and riveting tool disclosed in the present invention.
Figure 6:
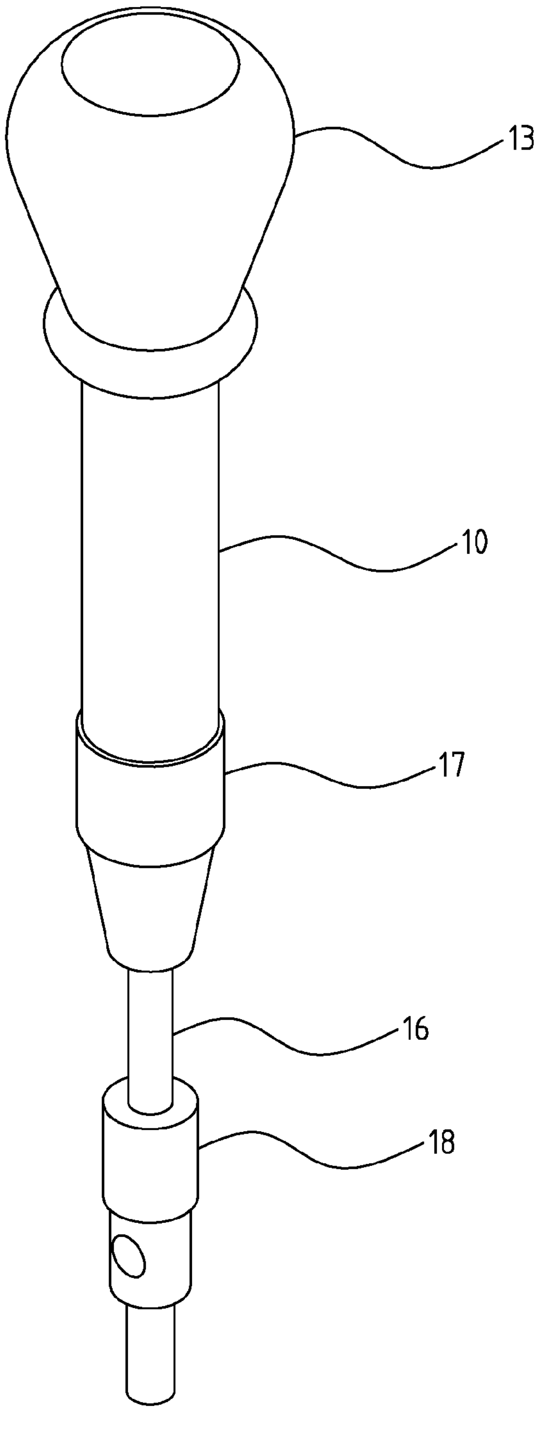
FIG.6 PRIOR ART
FIG. 6 shows an assembled perspective view of a prior art structure.
Figure 7:
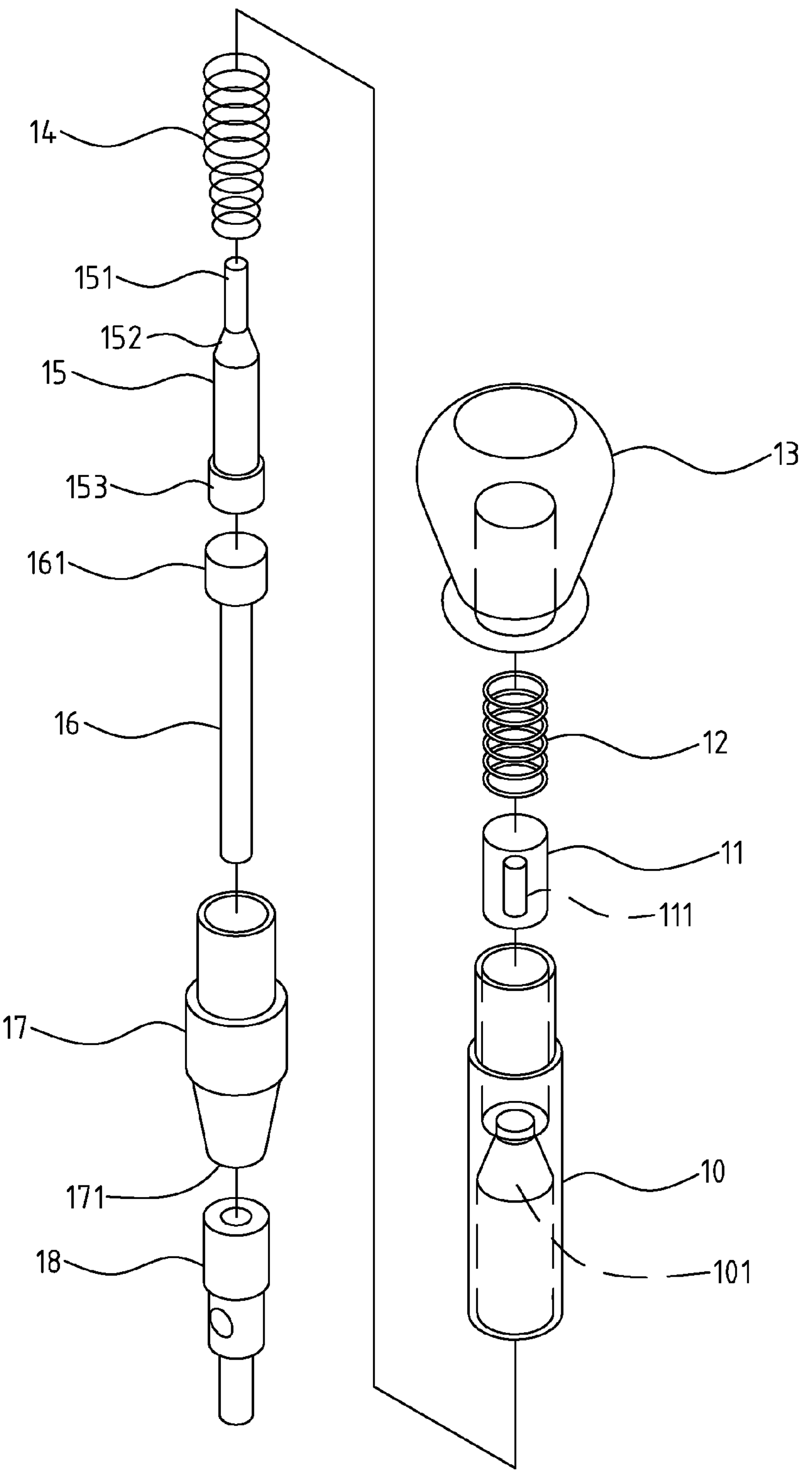
FIG.7 PRIOR ART
FIG. 7 shows an exploded perspective view of a prior art structure.
Figure 8:
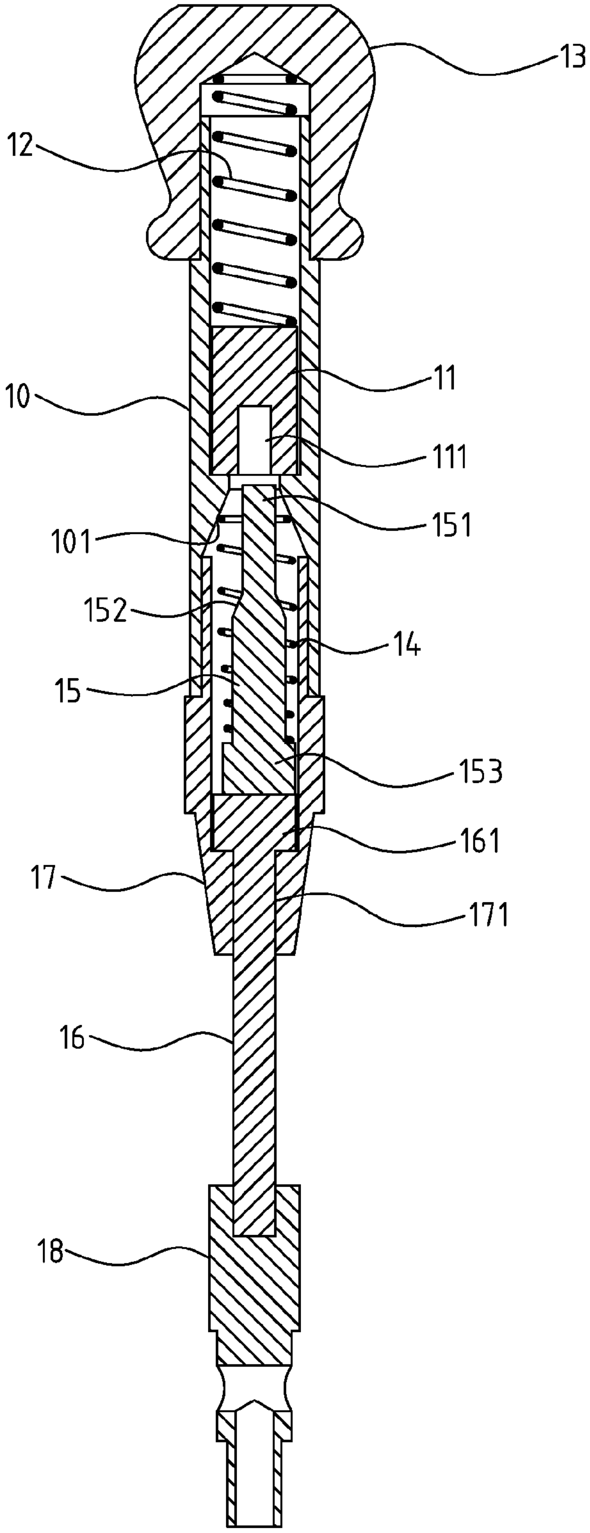
FIG.8 PRIOR ART
FIG. 8 shows an assembled sectional view of a prior art structure.
Figure 9:
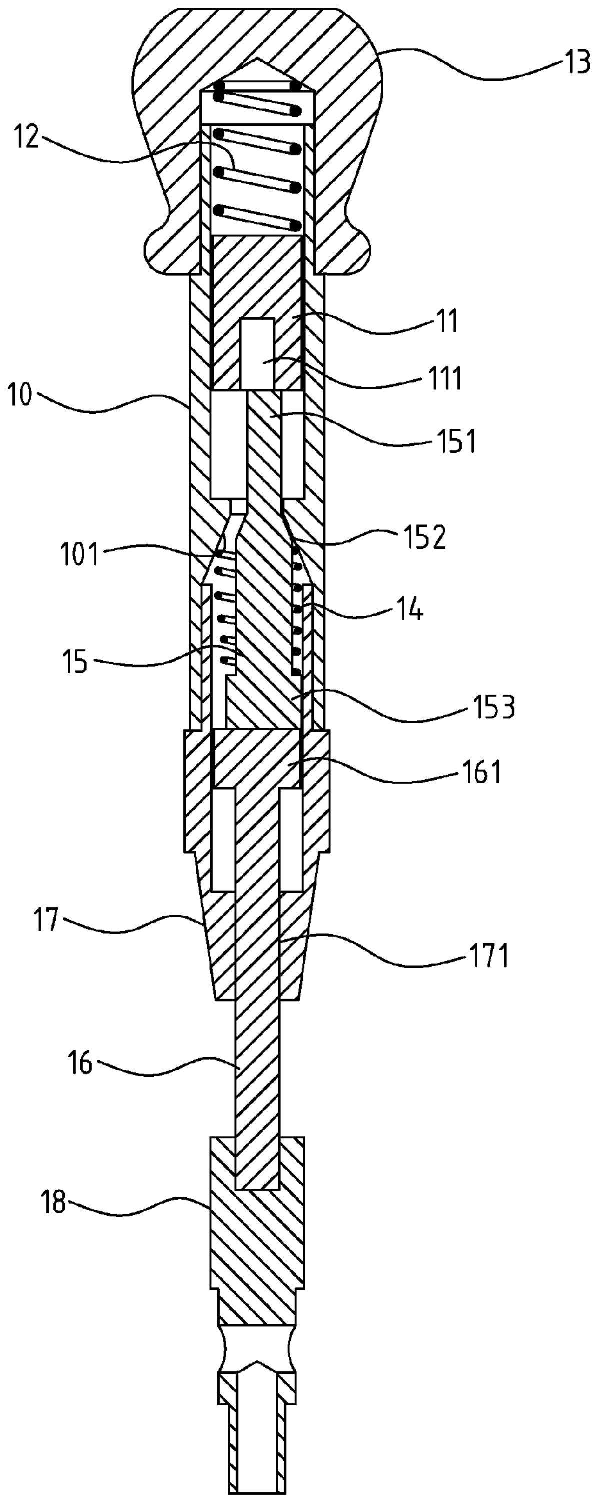
FIG.9 PRIOR ART
FIG. 9 shows a sectional operational view of energy storage of a prior art structure.
Figure 10:
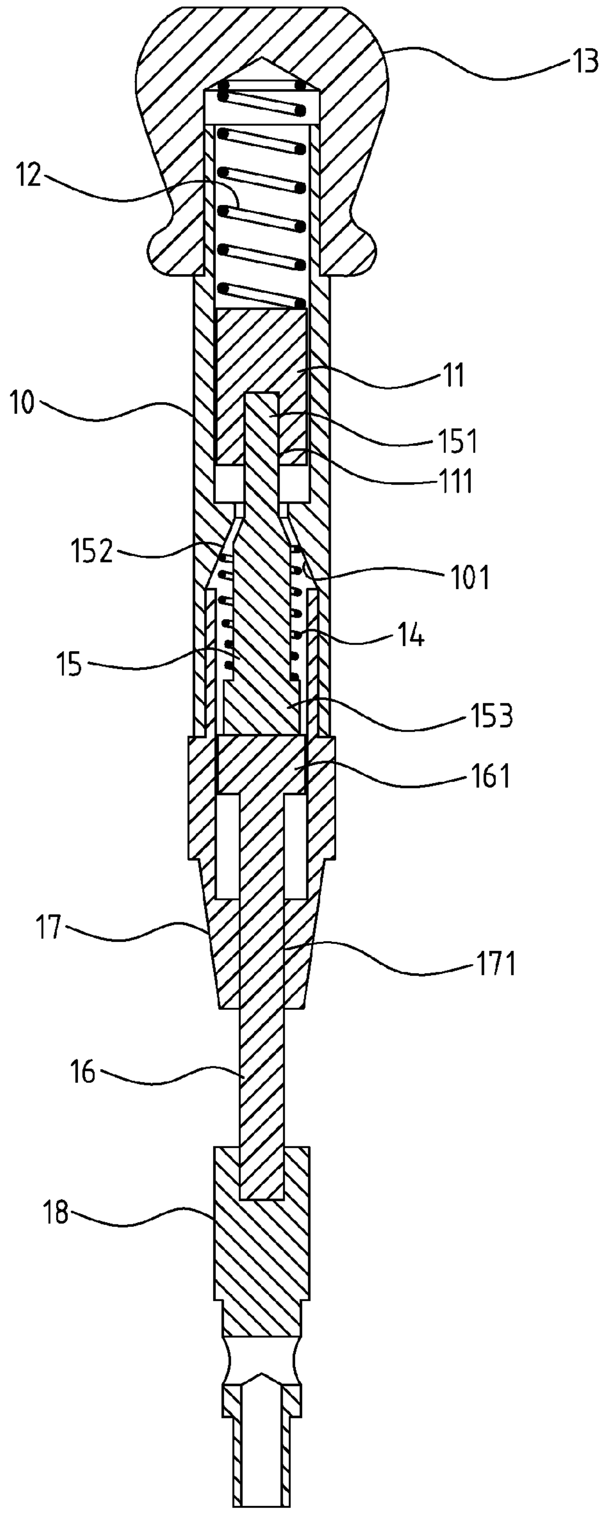
FIG.10 PRIOR ART
FIG. 10 shows a sectional view of the operation of energy release of a prior art structure.

In additional, the punching head 25 disclosed in the present invention is configured on the bottom of the collision head 24 through a locking screw in a manner that it is detached and replaced. Hence, other styles of the punching head 25B, 25C, 25D, 25E (see FIG. 5) are produced in the industry so that users can select according to their needs for various punching or riveting forms.

I claim:

1. A pusher and riveting tool comprising:

a hollow pipe shaft having an interior suitable for housing a tool therein;

a front cap threadedly locked onto a lower end of said pipe shaft, said front cap having a through hole in a center thereof, an energy storage spring having a first end and a second end;

a weight control rod linked to said first end of said energy storage spring, said weight control rod having a latch pin in a middle section thereof and a weight at a lower end thereof, a collision head having a collision part on an upper end thereof, said collision part extending through said through hole of said front cap, said collision head being linked to said second end of said energy storage spring, said weight control rod and said collision head being housed in said interior of said pipe shaft;

a punching head positioned at a lower end of said collision head;

a rear cap theadedly locked onto an upper end of said pipe shaft, said rear cap having a punch hole in a center thereof and a counterbore on an outside thereof, said counterbore being aligned with said punch hole, said weight control rod having a tail end extending outwardly of said pipe shaft and through said punch hole; and a pressing button and binding spring positioned in said counterbore of said rear cap, said pressing button and binding spring locking and fixing said weight control rod at said latch pin.

2. The punching and riveting tool of claim 1, said tail end of said weight control rod having a lock nut thereon.

3. The punching and riveting tool of claim 1, said pressing button having a go-through part on an inside thereof and a binding part on an outside thereof, said binding spring urging said pressing button outwardly of said counterbore of said rear cap, said tail end of said weight control rod extending through said punch hole of said rear cap and through said go-through part of said pressing button, said pressing button being pushed by said binding spring with said latch pin passes pressing button.

* * * * *